Feb. 15, 1966 K. E. HUMBERT, JR 3,235,085
FILTER UNIT HAVING DUAL PURPOSE VALVE ASSEMBLY
Filed Jan. 8, 1962 2 Sheets-Sheet 1
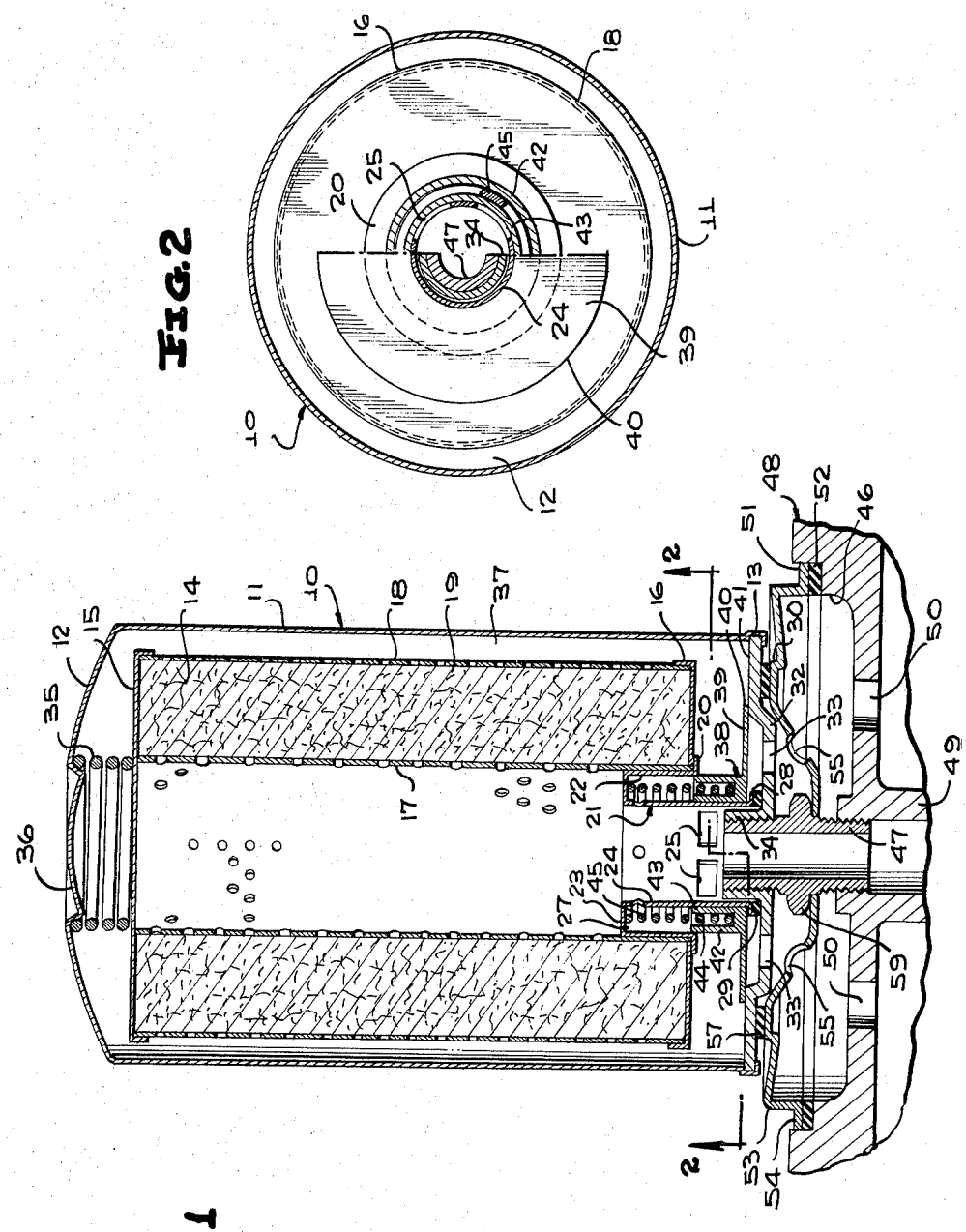
INVENTOR
KINGSLEY E. HUMBERT, JR.
BY *Shoemaker and Mattare*
ATTORNEYS Feb. 15, 1966 K. E. HUMBERT, JR 3,235,085
FILTER UNIT HAVING DUAL PURPOSE VALVE ASSEMBLY
Filed Jan. 8, 1962 2 Sheets-Sheet 2

INVENTOR
KINGSLEY E. HUMBERT, JR.

BY *Shoemaker and Mattare*

ATTORNEYS

United States Patent Office 3,235,085
Patented Feb. 15, 1966

3,235,085
FILTER UNIT HAVING DUAL PURPOSE VALVE ASSEMBLY
Kingsley E. Humbert, Jr., Gastonia, N.C., assignor to Wix Corporation, Gastonia, N.C., a corporation of North Carolina
Filed Jan. 8, 1962, Ser. No. 164,940
10 Claims. (Cl. 210—130)

The present invention relates to a filter unit, and more particularly to an oil filter of the spin-on, throw away type which is generally mounted on the engine block of an internal combustion engine and the like.

An object of the present invention is to provide an oil filter that is mounted directly on the engine block of an internal combustion engine, in which all of the oil in the engine flows through the filter.

It is another object of the present invention to provide an oil filter that is directly threaded onto the engine block of an internal combustion engine and which is provided with both a by-pass or relief valve and an anti-drain back valve permanently disposed therein.

It is another object of the present invention to provide a full-flow oil filter in which the filter cartridge, the by-pass or relief valve, and the anti-drain back or one-way valve are all permanently sealed within the filter casing so that the entire assembly is discarded as a unit and replaced with a new oil filter when the filter has become clogged.

It is another object of the present invention to provide an oil filter having an anti-drain back valve and a by-pass valve disposed therein and which valves actually consists of a single integral assembly so that the assembly will act as an anti-drain back valve depending upon one operating condition of the filter, and will operate as a by-pass valve when the operating condition of the oil flowing through the filter is different.

It is another object of the present invention to provide an oil filter consisting of a casing permanently sealing a filter cartridge therein, and a valve assembly which serves the dual function of being an anti-drain back valve and a by-pass valve, in which the valve operates as a one-way valve when the pressure drop across the filter, created by oil flowing through the filter is below a predetermined value, and in which the same valve functions as a by-pass valve when the oil flowing through the filter operates at a pressure above a predetermined value.

In accordance with the present invention, an oil filter is provided in which a filter cartridge is permanently enclosed within a housing or casing. Also enclosed within the casing is an anti-drain back valve and a by-pass valve. The casing is generally provided with threaded means thereon adapted to be threaded onto an adaptor bushing that is permanently mounted on the engine block of an internal combustion engine. The filter is further one that is generally known as a full-flow filter and is known as such because it is the type of filter that receives all of the flow of oil from the oil pump of an internal combustion engine and passes it through the filter to remove the contaminants therefrom, after which the clean oil is thereafter discharged to the oil galleries of the engine. Such an oil filter is generally disposed on the engine at a point thereon so that when the engine is not operating or is stopped, all of the oil in the filter is at a higher level than the oil reservoir in the engine, thus permitting the oil to drain back into the engine reservoir or crank case.

Since all of the oil of the internal combustion engine flows through the filter, it is obvious that such an oil filter must be provided with a by-pass or relief valve so that when the filter becomes clogged, the engine will not be starved of oil to lubricate the necessary parts. It is also obvious that when the engine is stopped, the filter must be provided with anti-drain back means so that the oil cannot drain back into the reservoir to cause temporary starvation of the engine when it is started up. It is also apparent that since the entire oil filter assembly is discarded and replaced with a new assembly when the filter becomes clogged, it is necessary to provide an anti-drain back valve and a by-pass valve that can be manufactured and incorporated in the oil filter in a most economical manner.

Accordingly, the present invention provides a novel oil filter containing an anti-drain back valve and a by-pass valve disposed therein which consists of a single valve assembly and which, therefore, performs two different functions and hence obtains two independent results, that is, one time it serves as an anti-drain back valve and at another time as a by-pass valve, although it is but a single valve assembly.

It is another advantage of the present invention that a dual purpose valve assembly is provided in which the valve will move a predetermined distance from its seat and open to act as an anti-drain back valve or one-way valve upon a certain operating pressure of the oil flowing through the filter, and the valve will also move a predetermined distance from its seat, and be maintained in an open position, which second mentioned predetermined distance is different from the first mentioned predetermined distance when the valve is acting as an anti-drain back valve, and the valve will thus function as a by-pass valve when the filter is clogged.

Various other objects and advantages of the present invention will be readily apparent from the following detailed description of the invention when considered in connection with the accompanying drawings forming a part thereof, and in which:

FIG. 1 is a vertical sectional view of an oil filter embodying the present invention;

FIG. 2 is a transverse section taken along lines 2—2 of FIG. 1;

Figure 3:
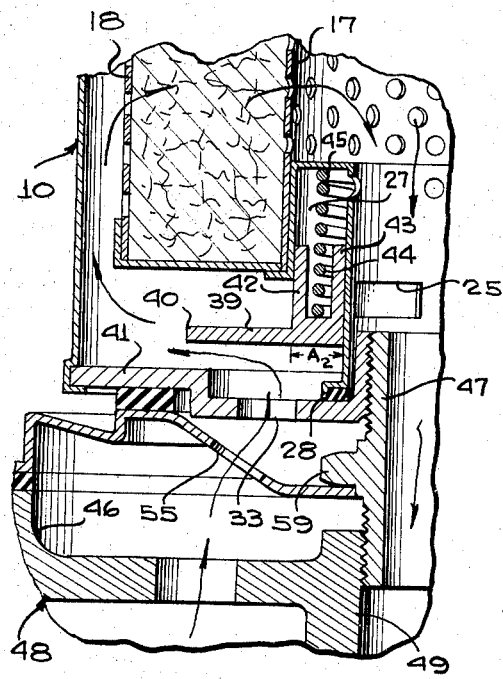
FIG. 3 is an enlarged fragmentary detail section, illustrating the valve assembly embodied in the present invention functioning as an anti-drain back or a one-way valve with the valve shown in an open position when the filter is operating satisfactorily.

Referring to the drawings, the reference numeral 10 generally designates an oil filter having a cylindrical casing or housing 11 with a dome-shaped top or closed end 12 and an open bottom end closed off by a circular plate or closure member 13.

Disposed within the casing 11 is an annular filter cartridge or element 14 having an upper circular end cap 15 and a lower annular end cap 16. The filter cartridge is provided with a perforated central tube 17 and may be provided with an outer cylindrical perforate body wrapper or member 18. The upper end cap 15 is secured to the upper edges of the central tube 17 and the body wrapper 18 so as to seal off the upper end of the filter cartridge. The lower annular end cap 16 is secured to the lower end of the central tube and body wrapper so as to seal off the lower end of the filter cartridge. Filter material 19 is disposed between the central tube and the body wrapper and is preferably of a fibrous mass such as sisal and the like although, of course, if desired, the filter may consist of conventional resin impregnated pleated paper, cotton waste and other well-known filtering materials.

The filter cartridge 14 is seated on an outwardly extending annular horizontal lip 20 of a filter support member or sleeve generally designated 21. The sleeve 21 consists of a vertically extending cylindrical portion 22, an inwardly extending annular portion 23 on the upper end thereof, and a downwardly extending inner cylindrical portion 24 in which are disposed a plurality of circumferentially spaced rectangular shaped discharge ports 25 in the lower end thereof. The cylindrical sleeve portions 21 and 22 are in spaced relationship with each other to provide an annular chamber 27 therebetween. The lower end of inner cylindrical portion 24 is flanged outwardly as at 28 and is secured to a resilient ring gasket 29, such as rubber or the like.

The closure plate member 13 is secured to the lower end of the oil filter casing 10 by any of the well known means, now employed in manufacture of cans, filters and like vessels, such as rolling the lower edge or lip 30 of the casing over the outside of the closure member and brazing or welding the parts to each other. Closure plate 13 is provided with a downwardly extending offset portion 32 adjacent its inner or central portion having circumferentially spaced oil inlet openings or ports 33 therein, and terminates in an inwardly or upwardly extending internally threaded neck or nipple 34.

The filter cartridge 14 is held in a fixed position on flange 20 in a fluid-tight relationship therewith by spring member 35 disposed on end cap 15 and mounted on a depressed portion 36 in the center of dome 12. Filter support member 21 is positioned over or around the outside of nipple 34 and spring member 35 also maintains it seated in a fluid-tight relationship on top of closure plate member 13. The ring gasket 28 is positioned inwardly of the oil inlet ports 33. The filter cartridge 14 is positioned within casing 11 so that an annular oil inlet chamber 37 is disposed around the outside thereof so that oil flowing into the casing will flow in an outside-in direction through the cartridge and clean oil will be discharged form the filter through the center tube 17.

Figure 4:
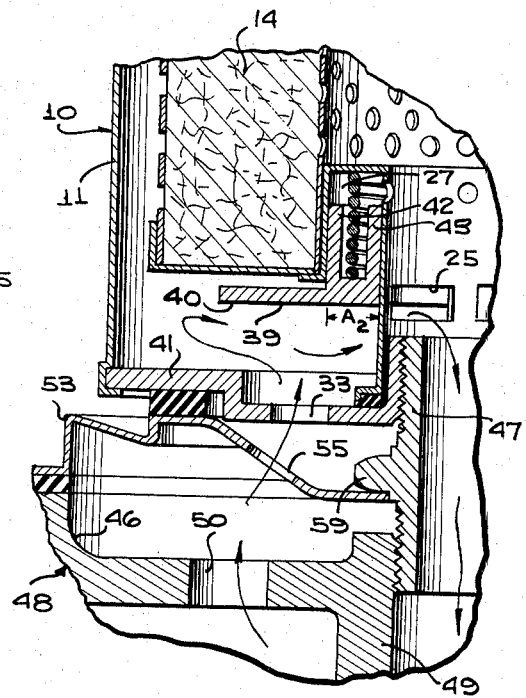
FIG. 4 is a fragmentary view similar to FIG. 3 but with the filter clogged and the valve assembly functioning as a by-pass valve.

A combination anti-drain back and by-pass valve assembly 38 is disposed within casing 10. The valve 38 has an annular flat or horizontal valve disc 39 having its circumferential portion 40 extending outwardly and overlapping the offset portion 32 of closure member 13 and adapted to seat on the circumferential portion 41 of the closure member. The valve disc 39 is provided with an upwardly extending outer sleeve member or portion 42 and an inner sleeve member or portion 43 forming an annular well chamber 44 therebetween. The inner sleeve 43 is adapted to solidably engage the inner vertical sleeve portion 24 of filter support member 21, while its outer sleeve 42 is adapted to slidably engage the outer vertical portion 22 of the filter support member, as best seen in FIGS. 3 and 4. Sleeves 42 and 43 are of sufficient length so that when the valve disc 39 is seated against portion 41 of the closure member 13 to close off oil inlet ports 33, the upper ends thereof extends into chamber 27 of filter support member 21 so as to also close off the by-pass oil ports 25. A spring member 45 is disposed within chamber 27 and extends into the well 44 of the valve assembly so as to normally urge the valve disc 39 down to a seated position to close off the flow of oil through ports 33 when the engine of the internal combustion engine is stopped. This prevents the oil in the oil galleries of the engine from draining back through the fileter cartridge 14 to the engine oil reservoir or crank case as hereinafter described. Openings or ports are disposed in the upper end of sleeve portion 24 to prevent hydraulic lock.

The oil filter 10 is adapted to be threaded onto an externally threaded hollow adaptor bushing 47 threaded into a central oil discharge passage or tube 49 disposed in the engine block 48 for supplying clean oil to the oil galleries of the engine. The adaptor bushing 47 is disposed centrally of a circular recess 46 formed in the engine block around tube 49 provided with oil inlet ports 50 in the bottom thereof in communication with the oil pump of the engine, not shown. A peripheral shoulder 51 is provided adjacent the upper end of the recess 46 and has a ring gasket 52 disposed thereon. An adaptor plate 53 having and outwardly extending rim or flange 54 seats on the gasket 52 in a fluid-tight relationship therewith. The adaptor plate 54 is provided with spaced oil inlet openings or ports 55 therein which communicate with the oil inlet ports 50 of the engine block and the filter oil inlet openings 33. The adaptor plate 53 is secured in position on the engine block by an annular collar 59 having wrench flats disposed on the threaded bushing 47, as clearly shown in the drawings, a central opening being provided in the adaptor plate 53 for receiving the adaptor bushing 47 therethrough. Oil is prevented from leaking between the adaptor plate 53 and the closure member 13 by a resilient ring gasket 57 secured to the bottom of the closure member 13 by cementing or the like, and disposed adjacent the circumferential portion 41 thereof.

In operation, the oil filter of the present invention is threaded onto the adaptor bushing 47 in a fluid-tight manner and thereafter when the engine is started, the engine oil pump will cause oil to flow through the ports 50, 55 and 33 into the oil filter casing or shell 11. The pressure of the oil will cause the valve disc 39 to move it from its closed or seated position shown in FIG. 1, to the open position shown in FIG. 3 when the oil filter is operating satisfactorily. The valve disc 39 is caused to open by the oil pressure acting against the entire area or on the bottom of valve 39, and this force is equal to the product of the area of the underside of valve disc 39 and the operating pressure of the oil flowing into the filter. This permits the oil to pass around the outer edge of valve discs 39 as illustrated in FIG. 3, and thereafter to flow through the filter cartridge, wherein dirt and contaminants are removed, and into and down center tube 17. The oil thereafter flows through filter support member 21 inwardly of vertical sleeve or portion 24. The oil then flows through the hollow adaptor bushing 47 and through the central oil tube 49 to the oil galleries of the engine to properly lubricate the engine. At this time, oil by-pass ports 25 in the filter support member are closed by the inner sleeve 43 of the valve assembly covering them.

When the engine is stopped and hence the engine oil pump becomes non-operative, the force in the biasing spring 45 will cause the valve disc 39 to move downwardly to the position shown in FIG. 1 to seat against the closure member 13 and prevent any oil from draining back from the oil galleries through central tube 49, the adaptor bushing 47 and filter 10 to the engine reservoir to thereby insure that there is oil in the galleries in the parts upon again starting of the engine.

Should the filter cartridge 14 become sufficiently clogged with contaminants so that it requires replacement and the oil will not pass through the filter cartridge, or so that there is sufficient restriction in the filter cartridge to build up the oil pressure on the upstream side of the filter above a predetermined value, the valve will move upwardly from the position shown in FIG. 3, to the position shown in FIG. 4, at which time the sleeve portions 42 and 43 of the valve move upwardly a substantial distance into the annular chamber 27 of the filter support member so that the by-pass ports 25 are uncovered to permit the oil to flow directly from the oil inlet ports 33 into and through the ports 25, causing the oil to by-pass or short circuit the filter cartridge 14. The oil then flows through the adaptor bushing 47 and into the center tube 49 to the oil galleries to properly supply oil to the necessary parts and to thus prevent damage to the engine despite the clogging of the full-flow filter.

At this time, the oil pressure on the upstream side of the filter entering inlet ports 33 is much higher than oil pressure normally flowing through the filter. This is due to the restriction caused by the clogged filter and thus the force acting against the valve disc 39 to move it from its first open position as shown in FIG. 3, to its second open position illustrated in FIG. 4, is equal to the product of the oil pressure and the area of the underside of the valve disc between sleeves 42 and 43, generally indicated as A in FIG 4.

It will thus be seen that the one-way valve operates to open a predetermined distance to the position shown in FIG. 3 due to the pressure imposed on the total area of the valve disc 39, while the valve disc moves another predetermined distance to the position shown in FIG. 4, to function as a by-pass valve when the oil pressure is at a substantially higher pressure due to the oil operating pressure being effective over a reduced area. With such a structure, it is thus apparent that a single valve or valve assembly has been provided which at one time will act as an anti-drain back or one-way valve, while at another time and under different oil pressure operating conditions it functions as a by-pass valve.

Figure 5:
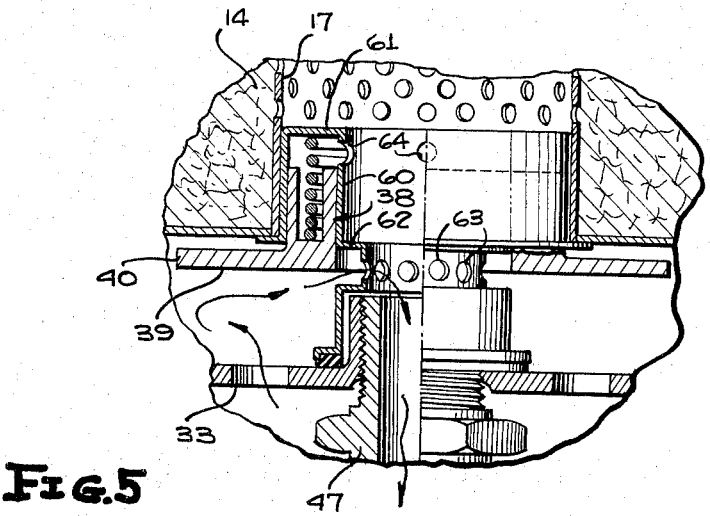
FIG. 5 is an enlarged fragmentary view of a modification of the invention illustrated in FIG. 1, and when the filter is clogged and the valve assembly is functioning as a by-pass valve.

The embodiment of the invention shown in FIG. 5 is substantially the same as that of FIG. 1, except that the inner vertical sleeve portion 60 of the filter support member 61 is provided with an annular indentation or rib 62 therein provided with a plurality of oil by-pass ports 63. The upper end of the vertical portion 60 also has apertures or openings 64 therein to prevent hydraulic lock above the valve 38. The rib is disposed in the vertical portion 60 so that the ports 63 will be covered when the valve is moved upwardly to open ports 33, and the filter is functioning during normal operation. As shown in FIG. 5, the valve disc 39 is in an open position so as to expose or open ports 63 when the filter is clogged and there is a substantially higher oil pressure operating on the valve disc 39 than during normal operation, so as to force the valve to its uppermost position to permit by passing of the oil directly from ports 33 through ports 63 to discharge the oil through the adaptor bushing 47.

It is thus apparent from the present invention that a novel valve assembly is provided which consists of a one valve that is unseated a predetermined distance during normal operation of the filter, and which valve is seated when the internal combustion engine is stopped to act as an anti-drain back valve, and then when the filter becomes clogged due to a substantially higher oil pressure acting on the valve, the valve is moved a predetermined distance from the closure member of the filter, which distance is greater than the predetermined distance it is raised from its seat during normal operation, so that the same valve functions as a by-pass valve, and the engine is not starved of oil.

It is apparent that the present invention also provides a combination anti-drain back valve and by-pass valve structure that may be manufactured inexpensively and which permits more tolerance in the manufacture thereof.

Inasmuch as various changes may be made in the form, location and relative arrangement of the several parts without departing from the essential characteristics of the invention, it will be understood that the invention is not to be limited except by the scope of the appended claims.

I claim:

1. An oil filter comprising a casing with an inlet and outlet in one end thereof, a filter support member disposed adjacent said one end surrounding said outlet, a filter element supported on said member between said inlet and outlet for filtering oil flowed therebetween, port means in said member for communicating said inlet with said outlet, a slidable valve member extending between and blocking the port means and said outlet, biasing means maintaining said valve member seated over said inlet when oil ceases to flow through said inlet, said valve member having an area disposed to permit the pressure of oil entering said inlet to unseat it a sufficient distance from said inlet to permit normal filtering of oil, and said valve being disposed to permit a substantially higher oil pressure to act against a reduced portion of said area when the filter is clogged to unseat said valve a further distance from said inlet to open said port means to permit oil to bypass said filter element.

2. An oil filter comprising a casing with an inlet and a central outlet, said inlet being disposed outwardly of said outlet, an annular tubular filter support member surrounding said outlet, a flange on said member, an annular filter element seated on said flange, an annular valve member slidably disposed on said tubular support member, port means in said tubular member for communicating said inlet with said outlet, said valve member embodying a valve disc portion for seating over said inlet and another portion for closing off said port means and blocking the latter and said inlet, biasing means maintaining said disc portion seated over said inlet when oil ceases to flow through said inlet, said disc portion being disposed to permit the pressure of oil entering said inlet to act against its total area to unseat it a sufficient distance during normal operation of the filter element while maintaining said other portion seated over said port means, and disposed to permit a substantially higher oil pressure to act against a reduced area of said disc portion when the filter is clogged to move said disc portion away from said inlet a further distance to uncover said port means to permit oil to short circuit said filter element.

3. The oil filter of claim 2 wherein said annular tubular filter support member comprises inner and outer spaced vertical portions forming a chamber therebetween, said inner portion is substantially longer than said outer portion, and said flange extends outwardly of said outer portion.

4. The oil filter of claim 3 wherein said port means consist of a plurality of spaced openings in said inner portion.

5. The oil filter of claim 3 wherein said inner portion has an annular constriction therein and said port means comprises spaced openings disposed in said constriction.

6. The oil filter of claim 2 wherein said other portion of said valve member comprises spaced inner and outer sleeves and said valve disc is a flat ring extending from between and outwardly of said sleeves.

7. The oil filter of claim 3 wherein said valve member comprises inner and outer spaced sleeves adapted to extend into said chamber and slidably engage said spaced inner and outer vertical portions.

8. The oil filter of claim 7 wherein said biasing means comprises a coil spring disposed within said chamber and within the space between said sleeves.

9. An oil filter unit comprising a casing having an end closure provided with an inlet and an outlet, a filter element in the casing in the oil flow stream between the inlet and the outlet for filtering oil passed therethrough from the inlet to the outlet, a valve unit in the casing supported on the end closure between the latter and the filter element and having a stationary part having at least one port communicating the inlet with the outlet and a movable part having a seated position in which it closes off said inlet and port, biasing means maintaining the said valve movable part in the seated position when oil ceases to flow through said inlet to prevent reverse flow of oil through said inlet, said movable part having an area disposed to be acted upon by the pressure of oil entering said inlet to be moved from seated to unseated position for admission of oil into the casing for passage through the filter element to the outlet when the filter is operating under normal conditions, and said valve part being arranged to move a greater distance from said seated position by a substantially higher oil pressure acting against said area resulting from clogging of the filter element to effect by-passing of oil around said filter element to and through the port in said stationary part of the valve unit to the outlet.

10. An oil filter unit comprising a casing having an end closure provided with an inlet and an outlet, a filter support member on said end closure, a filter element on said support member between said inlet and outlet for filtering oil flowing therebetween, said support member having a port communicating the inlet with the outlet, a slide valve unit disposed around said support member and having a movable part adapted to seat over said inlet and said port, means holding said movable part closed over said inlet when oil ceases to flow through said inlet, said valve member movable part being disposed to open an operating distance to admit oil to the casing when oil pressure at a selected normal value acts against its entire area during normal operation of the filter element, said valve member movable part being disposed to open an additional distance greater than said first mentioned distance to communicate the port with the inlet when a substantially higher oil pressure acts against a reduced area thereof due to a clogged filter.

References Cited by the Examiner

UNITED STATES PATENTS

| | | |
|---|---|---|
| 2,108,798 | 2/1938 | Dalrymple. |
| 2,533,266 | 12/1950 | Kovacs et al. 210—130 |
| 2,598,322 | 5/1952 | Vokes. |
| 2,995,249 | 8/1961 | Boewe et al. 210—130 |
| 3,036,711 | 5/1962 | Wilhelm 210—136 X |
| 3,042,215 | 7/1962 | Gruner 210—130 X |
| 3,083,832 | 4/1963 | Hathaway et al 210—136 X |

REUBEN FRIEDMAN, *Primary Examiner.*

HERBERT L. MARTIN, *Examiner.*